2,817,832

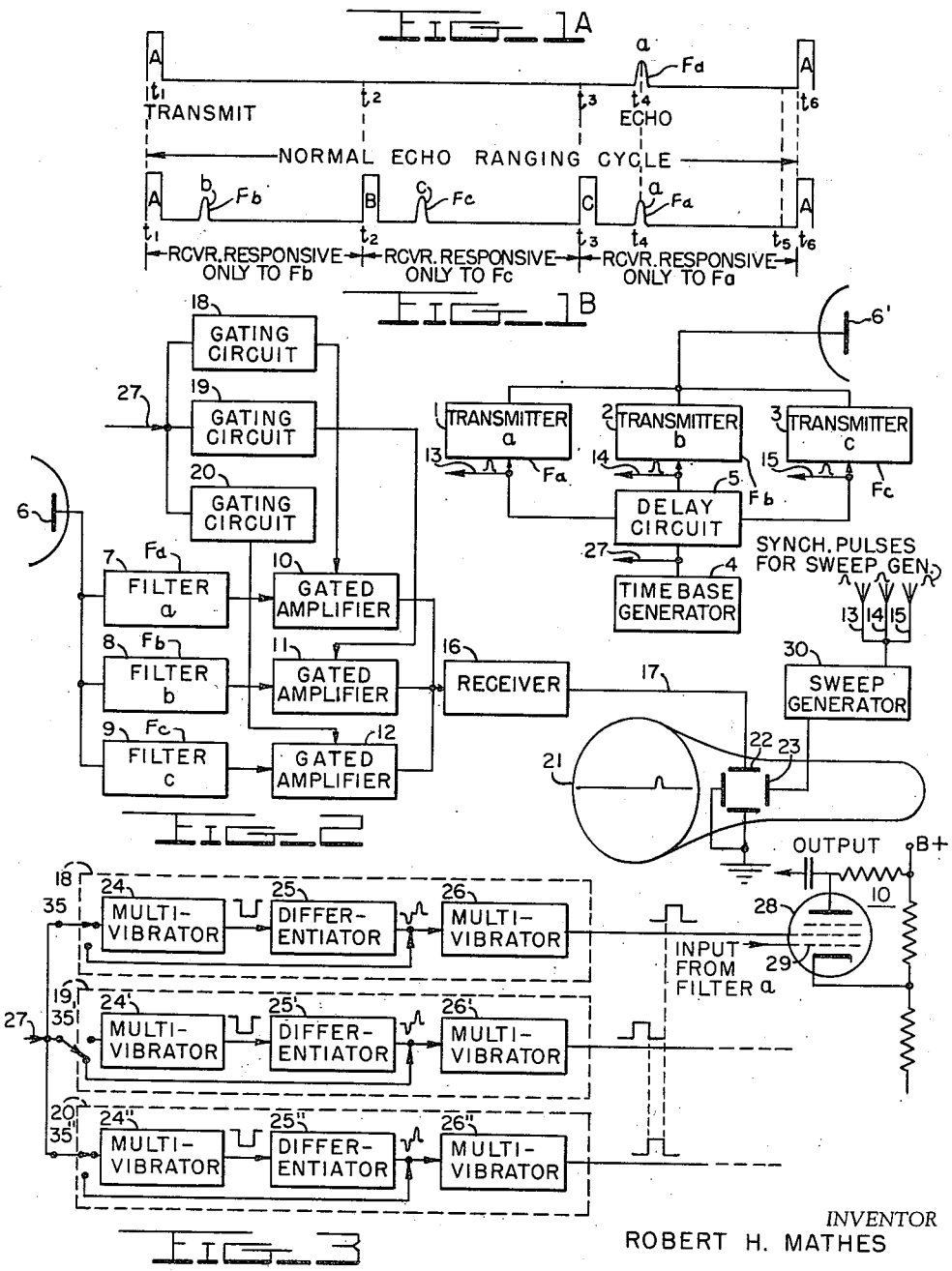

MULTIPLE SWEEP

Robert H. Mathes, Washington, D. C.

Application February 2, 1951, Serial No. 209,191

1 Claim. (Cl. 343—13)

(Granted under Title 35, U. S. Code (1952), sec. 266)

The present invention relates to a novel pulse echo detection system.

In systems wherein the range of various objects is determined by the difference in time occurring between the time of transmission of a pulse of energy and reception of the echo pulse measured by means of a cathode ray tube indicator, the more echo pulses which can be received from a given object per unit time the more accurate the target information will be with respect to the position of a moving target.

More echo pulses per unit time can be obtained, of course, by increasing the pulse repetition rate of the transmitted pulses. A point is reached however where the echo pulses resulting from one transmitted pulse return from a desired range after the next successive pulse is transmitted. This presents difficulties in the conventional echo indicating system since an echo pulse from a subsequent transmitted pulse may return with the echo pulses from the previous pulse which result in an ambiguous cathode ray tube pattern.

One object of the present invention is therefore to provide a novel pulse echo detection system utilizing the cathode ray tube type indication system wherein echoes resulting from successively transmitted pulses may be readily discerned.

Another object of the present invention is to provide a novel pulse echo detection system which enables using a higher transmitted pulse repetition rate without echo pulse ambiguity.

Another object of the present invention is to provide a novel pulse echo detection system wherein the system is more responsive to sudden target position changes, allows detection from greater ranges, and results in better target definition.

These and other objects of the present invention will become apparent upon reading the disclosure to follow and the drawings wherein:

Fig. 1a is diagram showing the pulse cycle of the conventional pulse echo system.

Fig. 1b is a diagram of the pulse cycle used with the present invention.

Fig. 2 is a block diagram respectively of the transmitter and receiving circuit used with the present invention.

Fig. 3 is a block diagram of one embodiment of the gate circuit shown in Fig. 1b.

Basically the present invention comprises the combination of means for periodically transmitting a series of equally time spaced pulses and wherein each adjacent pulse has a different carrier frequency, a cathode ray tube indicating means provided with a beam sweep initiated by and in isochronism with each transmitted pulse, a band pass filter for each carrier frequency, means for coupling the output of each filter to the signal input terminal of the cathode ray tube and gating means for rendering the said coupling means successively operative to couple the output of each filter to said cathode ray tube for a given predetermined interval of time after each transmitted pulse.

Referring now to the drawings where indentical reference numbers refer to like elements, Fig. 1a shows a normal pulse cycle wherein the transmission of a pulse A occurs at time $t1$, and an echo returns at time $t4$, the time between $t1$ and $t4$ being a measure of the range traversed by the echo pulse. Time $t6$ represents the beginning of the next transmitted pulse.

If three successive pulses A, B and C (referring to Fig. 1b) were transmitted between time $t1$ and $t6$, each at equal time intervals from the preceding pulse, and the pulse A initiating the next pulse cycle having a period $t6-t1$ occurs this same interval after the third pulse C (i. e., $t2-t1=t3-t2=t6-t3$), then the echo pulses from an object having the same range as represented by echo pulse $a$ in Fig. 1a ($t4-t1$) will occur at identical intervals ($t4-t3$) after each transmitted pulse. If, in Fig. 1b, it is assumed that there were previous identical pulse cycles to cycle $t6-t1$ before time $t1$, then an echo pulse $b$ from a given object which is the echo of the second pulse B in the cycle will occur $t4-t3$ seconds after the first pulse A, the echo pulse of the third pulse C of the cycle will occur $t4-t3$ seconds after the second pulse B, and the echo of the first pulse A will occur $t4-t3$ seconds after third pulse C.

If these pulses were displayed on a cathode ray tube screen having a sweep period of $t6-t1$ where the signal is applied to the vertical deflection means of the cathode ray tube, the Figure 1b would be the sweep pattern seen thereon.

If there were other echo pulses from objects relatively close by, then there would probably be an echo pulse of pulse A located between points $t2$ and $t1$ on the cathode ray tube screen and the observer would not be able to tell which pulse was the echo of pulse B, and which pulse was the echo of pulse A.

Such ambiguity can be substantially alleviated by giving different characteristics to the transmitted pulses A, B, and C so that appropriate receiver circuits can discriminate between them. Then by gating the discriminating circuits so that in a given time interval the receiving circuit will be responsive to the echo pulses only having a particular distinctive characteristic, the pulse ambiguity on the cathode ray tube will be alleviated.

The transmitted pulses could be differentiated by providing these pulses with different carrier frequencies, pulse width, or modulation frequencies and the example shown in the drawings utilizes a different carrier frequency for pulses A, B, and C, but it should be understood that other pulse characteristics may be varied and circuits devised to discriminate between pulses having these distinct characteristics.

Thus, if pulses A, B, and C are transmitted at different carrier frequencies, and filters 7—8—9 are respectively provided (see Fig. 2) to pass a different one of these frequencies, and if the output of the filters are gated so that the output of filter $b$ (filters $a$, $b$ and $c$ are respectively tuned to the frequency of pulses A, B and C) is coupled to the cathode ray tube (through a path 16 including the conventional intermediate frequency amplifier, detector and video amplifier stages [not shown] of a superheterodyne receiver) only during the cycle interval $t2-t1$, filter $c$ is coupled to the cathode ray tube only during the cycle interval $t3-t2$, and filter $a$ is coupled to the cathode ray tube only in the interval $t6-t3$, then the particular pulse ambiguity previously spoken about will be substantially eliminated.

In the present example, the receiving system is only operative to determine the range of pulses in the upper third of the range interval $t6-t1$. That is, in Fig. 1a, if $t3-t1$ represented a range of 50 miles and $t6-t1$ was 75 miles, then, if Fig. 1b represented the oscilloscope pattern which occurs when the sweep period is $t6-t1$, the intervals $t2-t1$, $t3-t2$ and $t6-t3$ all represent 50-75 mile range segments and pulses having a range less than 50 miles will not show up on the oscilloscope face.

If it were desired to see pulses having a range of from 25 to 50 miles, then the sequence in which the output of filters 7, 8 and 9 are gated must be changed so that in the cycle interval $t2-t1$, only filter $c$ is coupled in the circuit, in interval $t3-t2$ only filter $a$ is in the circuit, and in the interval $t6-t3$ only filter $b$ is in the circuit.

If the range interval of 0-25 miles is to be observed then the output of filter $a$ is coupled to the indicator circuit during the interval $t2-t1$ between transmitted pulse A—B, and the outputs of filters $b$ and $c$ are accordingly coupled to the indicator circuit during the respective time intervals $t3-t2$ between transmitted pulses B and C, and $t6-t3$ between transmitted pulses C and A.

A great improvement in range sensitivity and ease of reading the oscilloscope pattern is obtained if the echo pulses $a$, $b$ and $c$ are superimposed on each other in a trace presentation shown on the face of oscilloscope 21 in Figure 2.

To obtain this result, the sweep period is reduced to the interval between transmitted pulses ($t2-t1$) so that three identical sweeps occur in the interval $t6-t1$, then the pulses will be superimposed one upon the other and the scope pattern will look like Fig. 1a with the beginning of the trace representing, for example, the beginning of a 50-75 mile range segment.

In a typical example, the transmitter circuit shown in Fig. 2 consists of a time base generator 4 which delivers synchronizing pulses having a period equal to the pulse cycle $t6-t1$ to a delay circuit 5. Any suitable delay circuit may be used which for every pulse fed to its input circuits will deliver a plurality of time displaced pulses in the output circuits. The delay line network is a well known means for producing such a result. A delay line most commonly consists of a plurality of T or Pi network sections terminated in its characteristic impedance (see page 2-75, "Principles of Radar," by the M. I. T. Radar School Staff, 1944 edition).

If the input to transmitters $a$, $b$, $c$ are respectively coupled to three displaced positions along the above mentioned delay line so that the input pulse applied to the delay circuit is delayed respectively zero, $t2-t1$ and $t3-t1$ seconds, and the resulting pulses are used to trigger respectively pulse transmitters $a$, $b$ and $c$ which operate at different carrier frequencies, then a pulse cycle such as shown in Fig. 1b is obtained. The output of transmitters $a-c$ is fed to an antenna 6' in a conventional manner.

The transmitter circuit of Fig. 2 just described is exemplary only and any other suitable means may be used to accomplish the pulse cycle shown in Fig. 1b.

The receiver circuit must have circuits which will discriminate between the different pulses transmitted by transmitters $a$, $b$ and $c$. In the example of Fig. 2, filters $a$, $b$ and $c$ are coupled to the receiving antenna 6 and are tuned to pass only the carrier frequency of the pulses which were transmitted respectively by transmitters $a$, $b$ and $c$. To obtain the receiver channel switching action a plurality of gated amplifiers or the like 10, 11 and 12 are coupled respectively to filters $a$, $b$ and $c$, and may for example take the well known form of electronic switches such as an electron discharge device having a conductive and non-conductive condition or may consist of mechanical switches. These switches are made operative to couple the output of filter $a$, $b$ and $c$ successively to the rest of the receiver circuit respectively by delay gating circuit 18, 19, 20.

Fig. 3 discloses an exemplary circuit for the electronic switch embodiment wherein switches 10, 11 and 12, for example, could be normally non-conducting electron discharge devices of the type exemplified by tube 28 which is coupled to gated amplifier 10 and is rendered conductive only for the duration of control pulses fed thereto by the appropriate gate circuit 18, 19 or 20. The output of each filter may be fed to the control grid 29 of the respective switch tube so that the signal appears in the output of the discharge device only when it is conducting plate current.

The delay gate circuits 18, 19 and 20 are all triggered by the cycle initiating pulse of time base generator 4. The multivibrators 26, 26' and 26'' may be conventional one stability type multivibrators where a pulse of a given polarity fed thereto initiates a single gate pulse which in the example described would be about $t2$ to $t1$ seconds in duration.

The time occurrence of the keying pulse fed to respective multivibrators 26 to 26'' is determined by the trailing edge of the pulse output of delay multivibrators 24 to 24'' (which are single stability multivibrators like 26 and 26'' respectively). Multivibrators 24 to 24'' produce pulses which when differentiated by differentiator circuit 25—25'' produce a pulse of the correct polarity to trigger multivibrators 26 to 26''.

Assuming that the desired range segment is from 50-75 miles, (that is echo pulses to be received are received from $t3-t1$ to $t6-t1$ seconds after the corresponding transmitted pulse) by adjusting the duration of the pulse from multivibrator 24 to 24'' so that the trailing edge of the output pulses therefrom occurs respectively $t3-t1$ seconds, zero seconds, and $t2-t1$ seconds after the cycle initiating timing pulses from time base generator 4, proper gate pulses are delivered to electronic gate means 10 to 12. Multivibrator 26' in such case must be triggered directly by the timing pulses from generator 4 to produce the correct gating pulse for electronic gate means 10 which occurs during the interval $t2-t1$. Accordingly a two position switch 35' is provided to by-pass the timing pulses from delay multivibrator 24'. Switches 35 and 35'' perform a similar function when filters $a$ and $c$ are to be respectively operatively connected to receiver 16 during the interval $t2-t1$.

Although the particular gate and switch circuit first described is only exemplary, it should be noted that the relationship between the gating means and the switch means as used to gate the filter elements is one of the important aspects of the present invention without which a cathode ray tube type presentation could not readily be obtained for reasons previously explained.

The signal is shown applied to the vertical deflection plate of cathode ray tube 21 in Fig. 2. It is of course obvious that the signal could also be used to modulate the beam intensity.

The sweep system as previously explained is also a very important aspect of the present invention in that by having three sweeps for each pulse cycle the echo pulses are caused to be superimposed which allows a greater range sensitivity than where the sweep period is equal to the period of the pulse cycle $t6-t1$. This is because the noise level is random so that the superposition of the three or more echo pulses of the cycle renders the signal much easier to detect from the noise for a given signal to noise ratio.

It should be noted that the fact that all of the transmitted pulses are spaced in time equally from the preceding and subsequent pulse is very important because otherwise the echo pulses from a given target would not be received at equal intervals from the adjacent transmitted pulses which, in the case where the echo pulses return after the next transmitted pulse, would cause a confused oscilloscope picture and make the superposition of pulses not readily possible.

The sweep generator 30 which couples a generally sawtooth waveform to the horizontal deflection means 23 of cathode ray tube 21 in a conventional manner may be any suitable sawtooth generator which initiates a beam sweep in response to synchronizing pulses fed thereto.

Where the echo pulses $a$, $b$ and $c$ are to overlap, the pulses which are used to modulate transmitters $a$, $b$ and $c$ are also fed to sweep generator 30 where they are used as synchronizing pulses and thereby initiate sweeps at the instants pulses A, B and C are transmitted.

Many modifications may be made of the embodiments particularly described without deviating from the scope of the present invention.

The invention described herein may be manufactured and used by or for the Government of the United States of America for governmental purposes without the payment of any royalties thereon or therefor.

What is claimed is:

A pulse echo detection system comprising means for cyclically transmitting a plurality of pulses having interdistinguishing characteristic frequencies, each of said pulses being displaced from the pulse just preceding and following it by equal intervals of time, receiving means including a plurality of frequency discriminating means each responsive to different one of said distinguishable frequencies, a cathode ray tube indicating means, distinct switching means coupling each of said discriminating means to the signal input terminal of said cathode ray tube indicating means, gating means coupled to said distinct switching means for periodically rendering said switching means operative in a predetermined sequence to couple the output of said discriminating means successively to said cathode ray tube at a rate equal to the pulse repetition rate of the transmitted pulses, means providing said cathode ray tube with a sweep in synchronism with said transmitted pulses.

References Cited in the file of this patent

UNITED STATES PATENTS

| | | |
|---|---|---|
| 2,444,388 | De Vries | June 29, 1948 |
| 2,459,811 | Greig | Jan. 25, 1949 |
| 2,483,097 | Mcilwain | Sept. 27, 1949 |
| 2,513,282 | Busignies | July 4, 1950 |
| 2,517,752 | Wolff | Aug. 8, 1950 |
| 2,522,367 | Guanella | Sept. 12, 1950 |
| 2,525,328 | Wolff | Oct. 10, 1950 |
| 2,528,202 | Wolff | Oct. 31, 1950 |
| 2,700,156 | Sunstein | Jan. 18, 1955 |